United States Patent [19]
Giebel et al.

[11] Patent Number: 5,778,122
[45] Date of Patent: Jul. 7, 1998

[54] FIBER OPTIC CABLE ASSEMBLY FOR INTERCONNECTING OPTICAL FIBERS WITHIN A RECEPTACLE MOUNTED WITHIN THE WALL OF AN ENCLOSURE

[75] Inventors: Markus A. Giebel; Terry L. Cooke; Thomas Theuerkorn, all of Hickory, N.C.; Douglas E. Wolfe, Corning, N.Y.

[73] Assignee: Siecor Corporation, Hickory, N.C.

[21] Appl. No.: 773,012

[22] Filed: Dec. 24, 1996

[51] Int. Cl.[6] .................................................. G02B 6/38
[52] U.S. Cl. ............................ 385/55; 385/137; 385/138; 385/139; 385/59
[58] Field of Search ............................. 385/55, 137, 53, 385/54, 76, 77, 134, 138, 139, 59

[56] References Cited

U.S. PATENT DOCUMENTS

| | | | |
|---|---|---|---|
| 3,954,338 | 5/1976 | Hennel et al. | 385/137 |
| 4,398,797 | 8/1983 | Wedertz et al. | 350/96.21 |
| 4,744,629 | 5/1988 | Bertoglio et al. | 350/96.2 |
| 5,109,466 | 4/1992 | Seike et al. | 385/137 |
| 5,283,852 | 2/1994 | Gibler et al. | 385/137 |
| 5,416,874 | 5/1995 | Giebel et al. | 385/100 |
| 5,425,121 | 6/1995 | Cooke et al. | 385/112 |
| 5,561,726 | 10/1996 | Yao | 385/55 |

*Primary Examiner*—John Ngo

[57] ABSTRACT

The fiber optic interconnection apparatus includes a receptacle mounted at least partially within a wall of an enclosure, such as an optical network unit, a network interface device or a splice closure, and a fiber optic cable assembly for mating with the receptacle. By mating the fiber optic cable assembly with the receptacle in a predetermined aligned manner, one or more optical fibers of the fiber optic cable on which the fiber optic cable assembly is mounted can be optically interconnected with respective optical fibers held by the receptacle which extend through the receptacle and into the enclosure. Since the optical fibers which extend through the receptacle and into the enclosure may have been previously terminated, such as during the initial configuration of the enclosure in which the optical fibers are spliced or otherwise connected to other optical fibers or to active equipment within the enclosure, the fiber optic interconnection apparatus permits the optical fibers of the fiber optic cable to be appropriately terminated within the enclosure without requiring the enclosure to be opened. The components within the enclosure are therefore protected from damage which might otherwise result from opening the enclosure to terminate the optical fibers.

8 Claims, 5 Drawing Sheets

1

FIBER OPTIC CABLE ASSEMBLY FOR INTERCONNECTING OPTICAL FIBERS WITHIN A RECEPTACLE MOUNTED WITHIN THE WALL OF AN ENCLOSURE

BACKGROUND OF THE INVENTION

The present invention relates generally to fiber optic cable assemblies for connecting optical fibers and, more particularly, to fiber optic cable assemblies for interconnecting or otherwise terminating optical fibers within an enclosure, such as an optical network unit, a network interface device or a splice clincher.

Optical fibers are used in an increasing number and variety of applications, such as a wide variety of telecommunications and data transmission applications. As a result, fiber optic networks must include an ever increasing number of enclosures in which one or more of the optical fibers are terminated. For example, fiber optic networks, such as cable television (CATV) networks, may include a number of optical network units (ONUs) in which the optical signals propagating along the optical fibers are converted to respective electrical signals. In addition, telephone and CATV networks can include a number of network interface devices (NIDs), one of which is associated with each subscriber. Upon receiving the incoming optical signals, the NID splits and routes the signals to predetermined locations, such as to various telephone or CATV outlets. Like an ONU, the NID can also convert the incoming optical signals to electrical signals, if necessary. Fiber optic networks can also include a number of splice closures in which various ones of the optical fibers are spliced or optically connected.

These enclosures protect the optical fibers, such as from moisture or other forms of environmental degradation. These enclosures also isolate or otherwise protect the optical fibers within the enclosure from strain or torque imparted to a portion of the fiber optic cable outside of the enclosure in order to maintain proper alignment and spacing between the spliced optical fibers and to prevent undesirable signal attenuation.

Enclosures, such as ONUs, NIDs and splice closures, typically include a number of input ports through which fiber optic cables extend. Each input port of one conventional splice closure includes an annular female retainer through which a fiber optic cable extends. In order to connect the fiber optic cable to the annular female retainer of this conventional splice closure, a male retaining nut and a grommet are also typically mounted upon the fiber optic cable. Since the grommet is disposed upon the fiber optic cable forward of the male retaining nut, the grommet is held within the annular female retainer upon the engagement of the male retaining nut and the female retainer. Since the male retaining nut and the female retainer are typically threaded, the threaded advancement of the male retaining nut within the female retainer serves to axially compress the grommet, thereby causing the grommet to radially expand. As a result of this radial expansion, the grommet provides a watertight seal which prevents moisture from entering the splice closure via the input port.

Even though conventional enclosures provide strain relief, torsion relief and a barrier to water migration, conventional enclosures require brackets or other hardware to be mounted within the splice closure to engage the strength members of the fiber optic cables, thereby providing strain relief and torsion relief to the optical fibers. However, these brackets further complicate the design of the enclosure and require technicians to connect the strength member of each fiber optic cable to a respective bracket in order to provide the necessary strain relief and torsion relief for the optical fibers within the splice closure. Accordingly, several other cable assemblies have been developed to provide strain relief and torsion relief for optical fibers entering an enclosure, as well as to serve as a barrier to water migration into the enclosure.

In this regard, U.S. Pat. No. 5,416,874 to Markus A. Giebel, et al. describes a cable assembly for connecting a fiber optic cable to a splice closure. As described by U.S. Pat. No. 5,416,874, the fiber optic cable is prepared by removing the protective jacket from an end portion of the cable such that the strength member and one or more optical fibers extend outwardly from the transitional region of the fiber optic cable at which the protective jacket ends. The cable assembly of U.S. Pat. No. 5,416,874 includes a rigid aluminum tubular jacket positioned over the transitional region of the fiber optic cable such that the end of the protective jacket is disposed within the rigid aluminum tubular jacket. The rigid aluminum tubular jacket is then filled with an epoxy. Upon curing, the epoxy-filled jacket securely engages the strength member of the fiber optic cable which extends outwardly beyond the protective jacket of the fiber optic cable.

As described by U.S. Pat. No. 5,416,874, one end of the rigid aluminum tubular jacket is threaded. As a result, the threaded portion of the jacket can engage a threaded female retainer which is embedded within the wall of a splice closure such that the optical fibers extend into the splice closure for subsequent optical connection to other optical fibers. As a result of the engagement of the strength member of the fiber optic cable by the epoxy within the jacket, the cable assembly of U.S. Pat. No. 5,416,874 provides both strain relief and torsion relief to the optical fibers within the splice closure. In addition, the epoxy filled jacket provides a barrier to water migration into the splice closure.

Another cable assembly is described by U.S. Pat. No. 5,425,121 to Terry L. Cooke, et al. In addition to the rigid jacket positioned about the transitional region of the fiber optic cable as described by U.S. Pat. No. 5,416,874, the cable assembly of U.S. Pat. No. 5,425,121 further includes a water impervious plug. The water impervious plug is formed about a portion of the fiber optic cable forward of the rigid jacket. As a result, the plug is inserted into and extends within the internal cavity defined by the splice closure upon engagement of the threaded portion of the rigid jacket with the input port of the splice closure in order to provide additional protection for the optical fibers.

While the cable assemblies described by U.S. Pat. Nos. 5,416,874 and 5,425,121 connect a fiber optic cable with the input port of a splice closure in a manner which provides strain relief, torsion relief and a barrier to water migration, these cable assemblies require the optical fibers to extend through the input port of the enclosure and into the internal cavity defined therein. As a result, the enclosure must be physically opened in order to terminate the respective end portions of the optical fibers, such as by splicing or otherwise connecting the respective end portions of the optical fibers to other optical fibers or to active equipment within the enclosure. It is generally desirable, however, to reduce the number of times which an enclosure must be opened since the active equipment within the enclosure could be damaged by technicians terminating the optical fibers, such as by splicing or otherwise connecting the optical fibers extending through the input port to other optical fibers or to active equipment within the enclosure. In addition, the optical fibers and, more particularly, the fiber optic connectors mounted on the end portions of respective ones of the optical fibers could be damaged during the replacement or maintenance of active components within the enclosure, thereby potentially requiring replacement of an entire cable assembly. Accordingly, while conventional cable assemblies have been developed which securely connect a fiber optic cable to an enclosure such that the optical fibers extend into the enclosure for termination therein, these conventional cable assemblies disadvantageously require the enclosure to be repeatedly opened in order to properly terminate the optical fibers, thereby increasing the risk that components within the enclosure, such as active equipment within the enclosure, will be damaged.

SUMMARY OF THE INVENTION

It is therefore an object of the present invention to provide a fiber optic interconnection apparatus for terminating one or more optical fibers within an enclosure which reduces the possibility of damage to components within the enclosure, such as active equipment within the enclosure.

It is another object of the present invention to provide a fiber optic interconnection apparatus for terminating one or more optical fibers within an enclosure without requiring the enclosure to be opened.

These and other objects are provided, according to the present invention, by a fiber optic interconnection apparatus which includes a receptacle mounted at least partially within a wall of an enclosure, such as an ONU, a NID or a splice closure, and a fiber optic cable assembly for mating with the receptacle. By mating the fiber optic cable assembly with the receptacle in a predetermined aligned manner, one or more optical fibers of the fiber optic cable on which the fiber optic cable assembly is mounted can be optically interconnected with respective optical fibers held by the receptacle which extend through the receptacle and into the enclosure. In embodiments in which the optical fibers which extend through the receptacle and into the enclosure have been previously terminated, such as during the initial configuration of the enclosure in which the optical fibers are spliced or otherwise connected to other optical fibers or to active equipment within the enclosure, the fiber optic interconnection apparatus of the present invention permits the optical fibers of the fiber optic cable to be appropriately terminated within the enclosure without requiring the enclosure to be opened. As a result, the components, such as the active equipment, within the enclosure are protected from damage which might otherwise result from opening the enclosure to terminate the optical fibers.

The fiber optic cable assembly includes a housing having first and second opposed ends and defining a bore extending lengthwise therebetween. The second end of the housing is adapted to receive the end portion of a fiber optic cable containing at least one optical fiber. The fiber optic cable assembly can also include means for gripping the end portion of the fiber optic cable such that the end portion of the fiber optic cable is retained within the housing. For example, the gripping means can include an epoxy plug formed about the end portion of the fiber optic cable and secured within the housing.

The fiber optic cable assembly also includes a fiber optic connector disposed at least partially within the first end of the housing such that a first end of the fiber optic connector is exposed through the first end of the housing. The fiber optic connector defines at least one bore which opens through the first end of the fiber optic connector. The fiber optic connector receives the respective end portions of the optical fibers of the fiber optic cable such that the end portions of the optical fibers are also exposed through the first end of the housing. According to one embodiment, the fiber optic connector includes one or more single fiber connectors for receiving the end portion of a single optical fiber. According to another embodiment, the fiber optic connector is a multi-fiber connector for receiving the end portions of a plurality of optical fibers.

The housing and, more particularly, the bore defined by the housing can also include a storage chamber. The storage chamber is preferably disposed between the gripping means and the fiber optic connector for storing excess portions of the optical fibers. As a result, additional lengths of optical fiber can be provided if the fiber optic connector must be replaced or reconnected.

According to the present invention, the receptacle is mounted at least partially within the wall of an enclosure. The receptacle includes a receptacle body having first and second opposed ends and defining a bore extending lengthwise therebetween. The receptacle is mounted within the wall of the enclosure such that the second end of the receptacle body opens into the enclosure.

The receptacle also includes a fiber optic connector disposed at least partially within the bore of the receptacle body such that a first end of the fiber optic connector is exposed through the first end of the receptacle body. The fiber optic connector of the receptacle also defines at least one bore opening through the first end of the fiber optic connector for receiving the respective end portions of optical fibers which extend through the second end of the receptacle body and into the enclosure. As a result, the respective end portions of the optical fibers are also exposed through the first end of the receptacle body. The fiber optic connector of the receptacle is preferably the same type of connector as the fiber optic connector of the corresponding fiber optic cable assembly. For example, the fiber optic connector of the receptacle can be a single fiber connector for receiving the end portion of a single optical fiber or a multi-fiber connector for receiving the end portions of a plurality of optical fibers.

Upon mating the fiber optic cable assembly with the receptacle, such as by inserting the first end of the fiber optic cable assembly within the first end of the receptacle, the respective fiber optic connectors of the receptacle and fiber optic cable assembly are disposed in an aligned relationship. As a result, the optical fibers of the fiber optic cable to which the fiber optic cable assembly is mounted are optically interconnected with the optical fibers which extend through the receptacle and into the enclosure. While the fiber optic cable assembly can be mated with the receptacle in a variety of fashions, the housing of the fiber optic cable assembly can include a threaded coupler and the first end of the receptacle body can be correspondingly threaded for engaging the threaded coupler during mating of the fiber optic cable and the receptacle.

In order to appropriately align the optical fibers, the fiber optic cable assembly can also include an alignment member for holding the fiber optic connector. The alignment member includes an alignment feature disposed in a predetermined relation to the fiber optic connector held by the alignment member. Likewise, the receptacle can include an alignment member for holding the respective fiber optic connector. The alignment member of the receptacle also includes an alignment feature disposed in a predetermined relation to the fiber optic connector held the alignment member. By aligning the respective alignment features of the alignment members of the fiber optic cable assembly and the receptacle, the optical fibers of the fiber optic cable to which the fiber optic cable assembly is mounted can be precisely aligned with the optical fibers extending through the receptacle and into the enclosure. For example, the receptacle body can include means for aligning the respective alignment features of the alignment members of the fiber optic cable assembly and the receptacle.

In order to facilitate mating of the fiber optic cable assembly with the receptacle, the fiber optic cable assembly can also include a bias member disposed within the bore defined by the housing to permit limited retraction of the fiber optic connector upon mating of the fiber optic cable assembly with receptacle. Likewise, the receptacle can also include a bias member, such as a spring, disposed within the bore defined by the receptacle body for permitting limited retraction of the respective fiber optic connector upon mating of the fiber optic cable assembly with receptacle.

Once mated, the optical fibers of the fiber optic cable upon which the fiber optic cable assembly is mounted are optically interconnected with the optical fibers held by the receptacle which extend through the receptacle and into the enclosure. Since the optical fibers which extend through the receptacle and into the enclosure may have been previously terminated within the enclosure, such as during the initial configuration of the enclosure in which the optical fibers are spliced or otherwise connected to other optical fibers or to active equipment within the enclosure, the optical fibers of the fiber optic cable upon which the fiber optic cable assembly is mounted can be effectively terminated within the enclosure without opening the enclosure. As a result, the risk of damaging components, such as active equipment, within the enclosure during the process of terminating the optical fibers is reduced, if not eliminated, by the fiber optic interconnection apparatus of the present invention.

BRIEF DESCRIPTION OF THE DRAWINGS

The foregoing and other advantages and features of the invention, and the manner in which the same are accomplished, will be more readily apparent upon consideration of the detailed description of the invention taken in conjunction with the accompanying drawings, which illustrate preferred and exemplary embodiments, and wherein.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
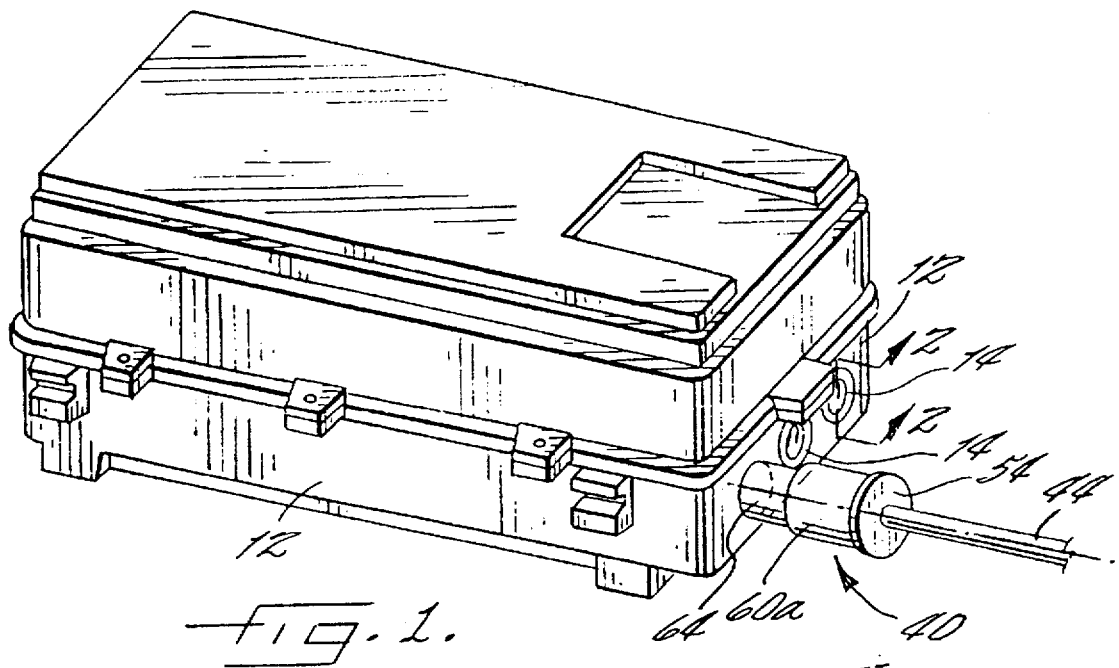
FIG. 1 is a perspective view of an enclosure which illustrates a fiber optic cable assembly mated with a receptacle according to one embodiment to the present invention.

Referring now to FIG. 1, an enclosure 10 is depicted in which one or more optical fibers are terminated. For example, the optical fibers can be coupled or spliced to other optical fibers or can be interconnected to active equipment within the enclosure. The enclosure can be any of a variety of structures in which one or more optical fibers are terminated. For example, the enclosure can be an ONU in which the optical signals propagating along the incoming optical fibers are converted to respective electrical signals. Further, the enclosure can be a NID which splits and routes the incoming optical signal to predetermined locations within a CATV or telephone network, for example. Alternatively, the enclosure can be a splice closure in which the incoming optical fibers are coupled or spliced to respective ones of the outgoing optical fibers.

The enclosure 10 includes a number of walls 12 which define an internal cavity within which the optical fibers are terminated. In addition, various types of active equipment can be disposed within the internal cavity of the enclosure to process the optical signals propagating along the incoming optical fibers. As shown, the enclosure defines one or more input ports 14 which extend through a wall of the enclosure and open into the internal cavity.

Figure 2:
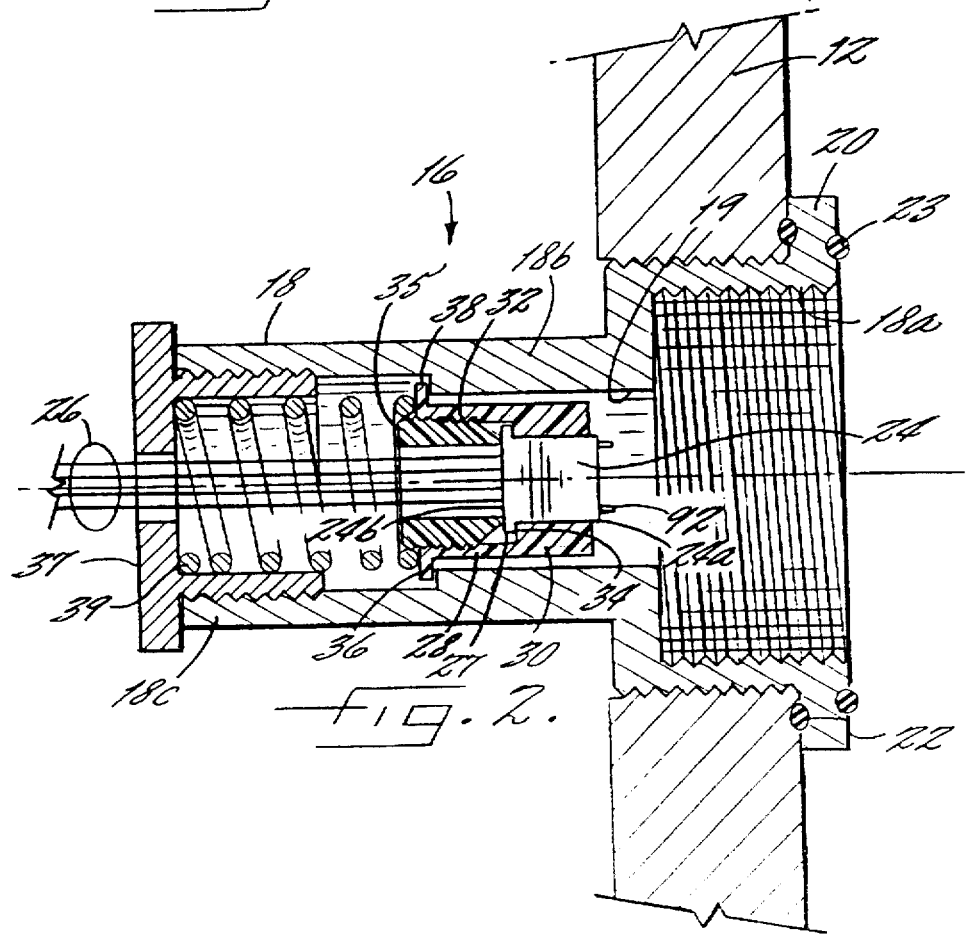
FIG. 2 is a cross-sectional view of a receptacle according to one embodiment of the present invention.
Figure 3:
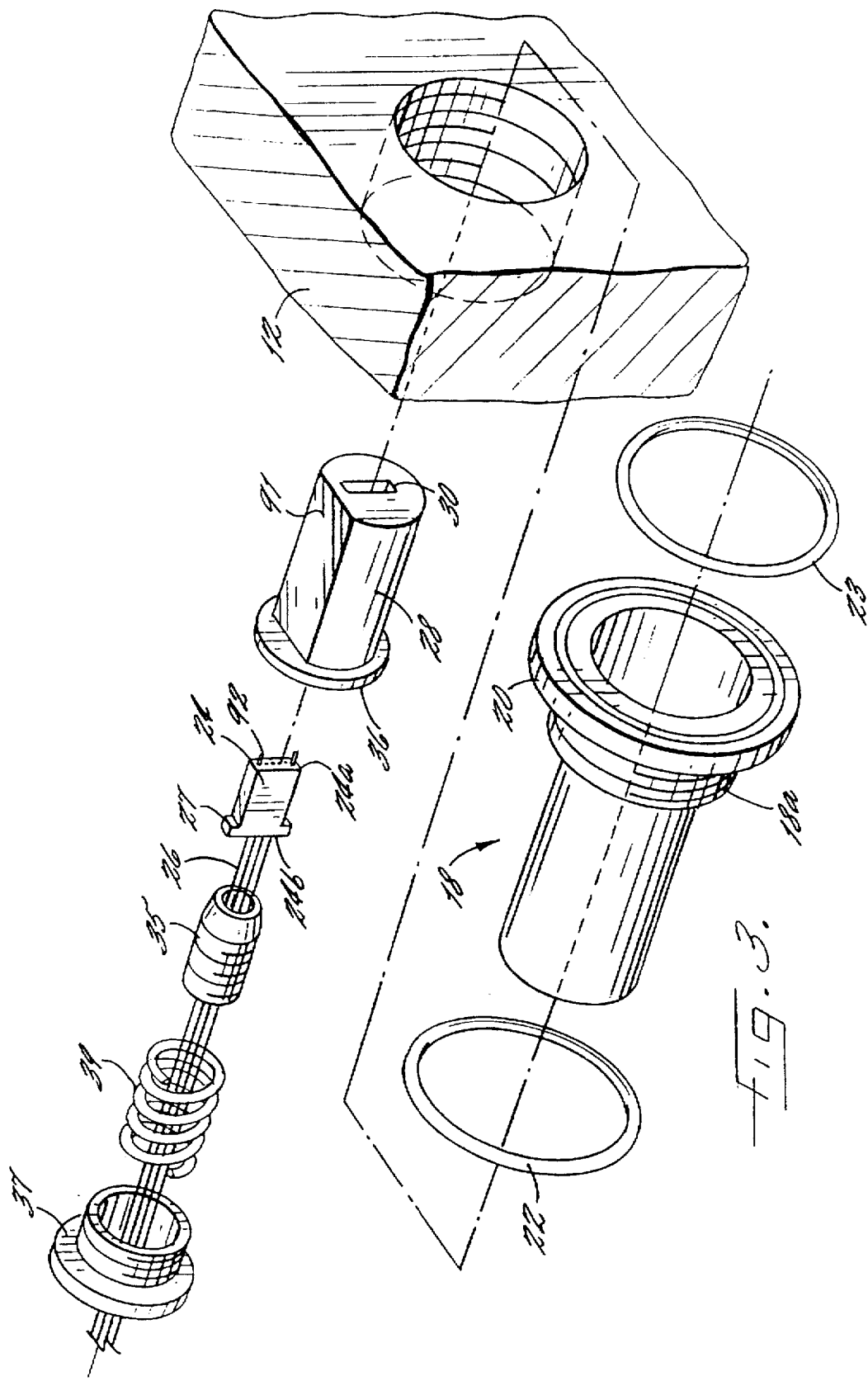
FIG. 3 is an exploded perspective view of a receptacle according to one embodiment to the present invention.

As shown in cross section in FIG. 2 and in the exploded perspective view of FIG. 3, the input port 14 of the enclosure 10 of the present invention includes a receptacle 16 mounted at least partially within a wall 12 of the enclosure. The receptacle includes a receptacle body 18, typically comprised of stainless steel, which is mounted within a respective aperture defined through the wall of the enclosure. For example, a portion of the receptacle body can be externally threaded such that the receptacle body is threadably engaged within the wall of the enclosure. In order to properly seat the receptacle body within the wall of the enclosure, the first end of the receptacle body which opens outside of the enclosure preferably includes a flange 20 which extends radially outward. Thus, the receptacle body can be threadably advanced into the wall until the flange abuts the exterior surface of the wall, thereby properly seating the receptacle body within the wall.

In order to seal the receptacle 16 within the aperture defined by the wall 12, the receptacle also preferably includes a sealing member 22, such as an O-ring or other annular gasket, disposed between the flange 20 at the first end of the receptacle body 18 and the exterior surface of the wall. As shown in FIGS. 2 and 3, another sealing member 23, such as another O-ring or other annular gasket, can be positioned upon the exterior surface of the flange for providing a tight seal upon mating with a fiber optic cable assembly 40 as described hereinbelow.

The receptacle body 18 defines a bore extending lengthwise from the first end of the receptacle body which opens outside of the enclosure 10 to an opposed second end which opens into the enclosure. As described hereinafter, the bore defined by the receptacle body of one advantageous embodiment includes an enlarged diameter portion 18a adjacent the first end of the receptacle body, a reduced diameter portion 18b in a medial portion of the receptacle body and an intermediate diameter portion 18c adjacent the second end of the receptacle body. However, the receptacle body of other embodiments can define a bore having a uniform diameter or a different combination of diameters than those described above without departing from the spirit and scope of the present invention.

Figure 6:
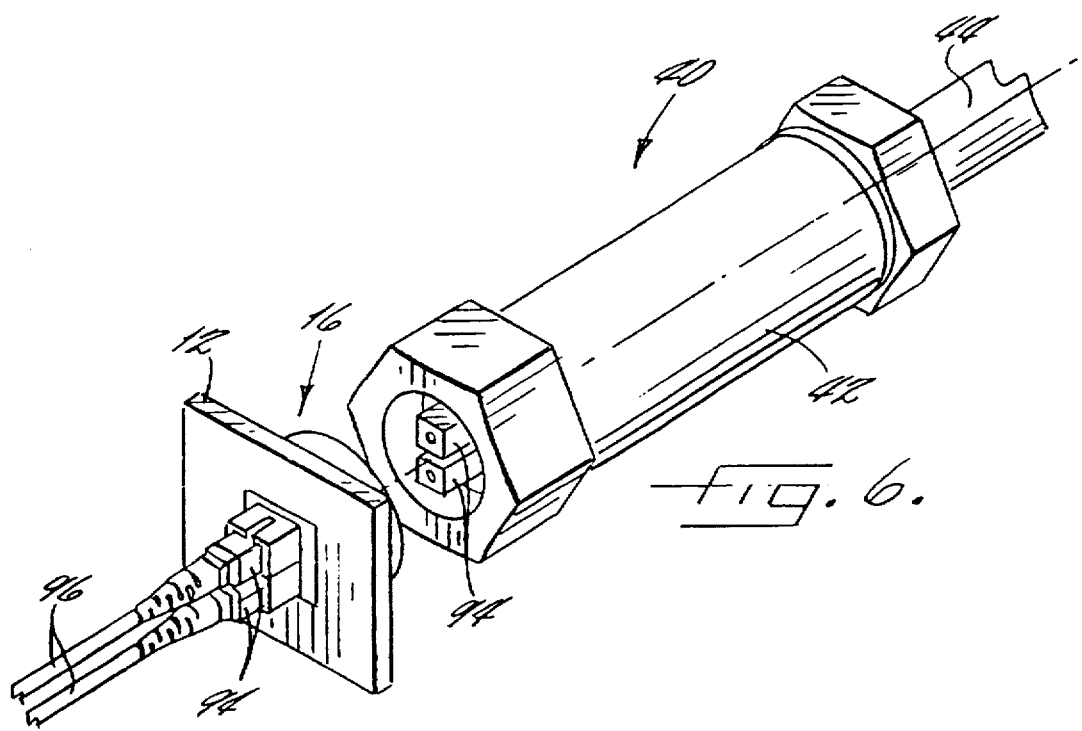
FIG. 6 is a perspective view of a fiber optic cable assembly and a receptacle according to another embodiment to the present invention which provides for the optical interconnection of a pair of optical fibers terminated with respective single fiber connectors.
Figure 7:
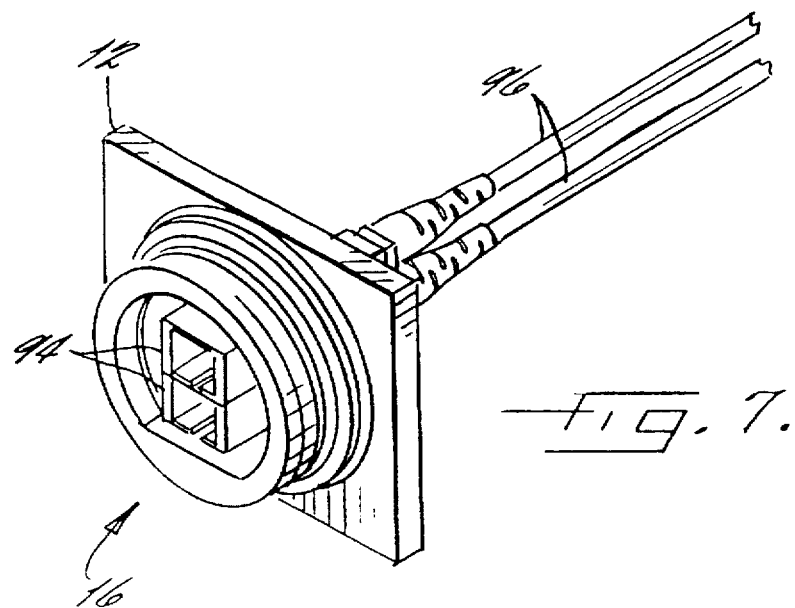
FIG. 7 is a fragmentary perspective view of the receptacle of the embodiment illustrated in FIG. 6.

The receptacle 16 also includes a fiber optic connector 24 disposed at least partially within the bore of the receptacle body 18 such that a first end 24a of the fiber optic connector is exposed through the first end of the receptacle body. As shown in FIG. 2, the fiber optic connector of the receptacle is a multi-fiber connector, such as an MT connector, which receives the end portions of a plurality of optical fibers 26. As shown in FIGS. 6 and 7, however, the fiber optic connector of another embodiment of the receptacle can include one or more single fiber connectors, such as SC or ST connectors, for receiving the respective end portions of single optical fibers without departing from the spirit and scope of the present invention.

According to one advantageous embodiment illustrated in FIGS. 2 and 3, the fiber optic connector 24 is held within an alignment member 28, typically formed of plastic, which is also disposed within the bore defined by the receptacle body 18. In particular, both the alignment member and the fiber optic connector are disposed at least partially within the reduced diameter portion 18b of the bore defined by the receptacle body.

Although the fiber optic connector 24 can be held within the alignment member 28 in a variety of fashions, the alignment member of the illustrated embodiment defines a cavity 30 shaped and sized to match the fiber optic connector. The cavity defined by the alignment member opens toward the first end of the receptacle body 18 such that the first end 24a of the fiber optic connector is exposed within the first end of the receptacle body. The alignment member of the illustrated embodiment also defines generally cylindrical opening 32 which opens toward the second end of the receptacle body. The cavity and the generally cylindrical opening defined by the alignment member preferably define a continuous passageway therethrough.

As shown in FIGS. 2 and 3, the rear or second end 24b of the fiber optic connector 24 can include laterally extending tabs 27 which engage an internal shoulder 34 defined within the alignment member 28 between the cavity 30 which opens toward the first end of the receptacle body 18 and the generally cylindrical opening 32 which opens toward the second end of the receptacle body. Thus, the fiber optic connector can be properly seated within the cavity defined by the alignment member such that the first end 24a of the fiber optic connector is exposed through the first end of the receptacle body.

The receptacle 16 of this advantageous embodiment can also include an externally threaded sleeve 35, typically formed of plastic, which is received within and threadably engages the generally cylindrical opening 32 defined by the alignment member 28. As shown in FIG. 2, the sleeve can be threadably advanced within the generally cylindrical opening until the sleeve contacts the rear or second end 24b of the fiber optic connector 24. As a result, the alignment member and the sleeve cooperate to secure the fiber optic connector within the cavity 30 defined by the alignment member by holding the laterally extending tabs 27 of the fiber optic connector against the internal shoulder 34 defined within the alignment member.

In the illustrated embodiment, the end of the alignment member 28 which faces the second end of the receptacle body 18 can also include a flange 36 which extends radially outward to ensure that the alignment member and, in turn, the fiber optic connector 24 are properly seated within the reduced diameter portion 18b of the receptacle body. As shown, the flange of the alignment member can engage an internal shoulder 38 defined within the receptacle body between the reduced diameter portion and the intermediate diameter portion 18c.

In order to secure the alignment member 28 and, in turn, the fiber optic connector 24 within the bore of the receptacle body 18, the receptacle 16 can also include an annular back retainer 37, typically formed of stainless steel, which threadably engages the second end of the receptacle body. The receptacle of this embodiment can also include a bias member 39, such as a spring, which is disposed within the intermediate diameter portion 18c of the bore defined by the receptacle body. Thus, the bias member extends between the back retainer and either the flange 36 of the alignment member or the externally threaded sleeve 35. In any event, the bias member urges the alignment member and, in turn, the fiber optic connector toward the first end of the receptacle body while permitting limited retraction of the fiber optic connector upon application of external forces to the fiber optic connector, such as during mating of the fiber optic cable assembly 40 with the receptacle as described hereinbelow.

In addition to the receptacle 16, the fiber optic interconnection apparatus also includes a fiber optic cable assembly 40 which is designed to mate with the receptacle in a manner described hereinbelow. The fiber optic cable assembly includes a housing 42 having first and second opposed ends 42a and 42b and defining a bore extending lengthwise therebetween. Typically, the housing is formed of stainless steel. However, the housing can be formed of other materials, such as plastic, if desired. As shown in cross section in FIG. 4, the housing and, more particularly, the second end of the housing is adapted to receive the end portion of a fiber optic cable 44. The fiber optic cable includes at least one optical fiber 46, typically disposed within a buffer tube 47, which extends through the bore defined by the housing to the first end of the housing. The fiber optic cable also typically includes a lengthwise extending strength member 48 and a protective jacket 50 surrounding the strength member and the buffer tube. As shown, the fiber optic cable can include a single central buffer tube in which one or more optical fibers are disposed. The fiber optic cable of this exemplary embodiment would also typically include a strength member, such as a KEVLAR® yarn, extending lengthwise along or about the buffer tubes. Alternatively, the fiber optic cable can include one or more buffer tubes disposed about a centrally located strength member, such as a metallic rod.

The fiber optic cable assembly 40 also includes means for gripping the end portion of the fiber optic cable 44 such that the end portion of the fiber optic cable is retained within the housing 42. In the illustrated embodiment, the protective jacket 50 has been removed from the end portion of the fiber optic cable to thereby expose the central buffer tube 47 which includes at least one optical fiber 46, as well as the lengthwise extending strength member 48, such as a KEVLAR® jacket which surrounds the buffer tube.

Figure 4:
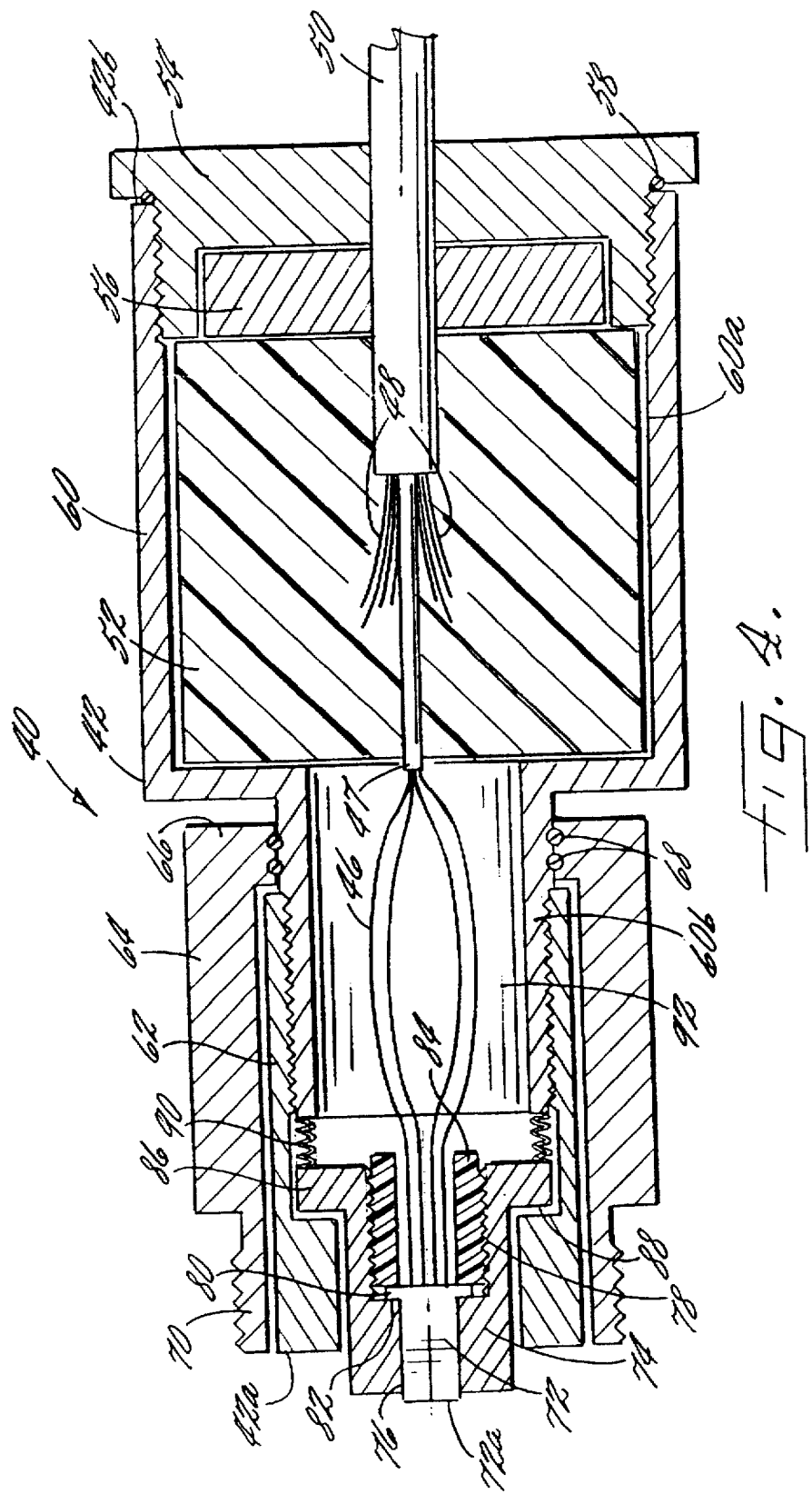
FIG. 4 is a cross-sectional view of a fiber optic cable assembly according to one embodiment to the present invention.
Figure 5:
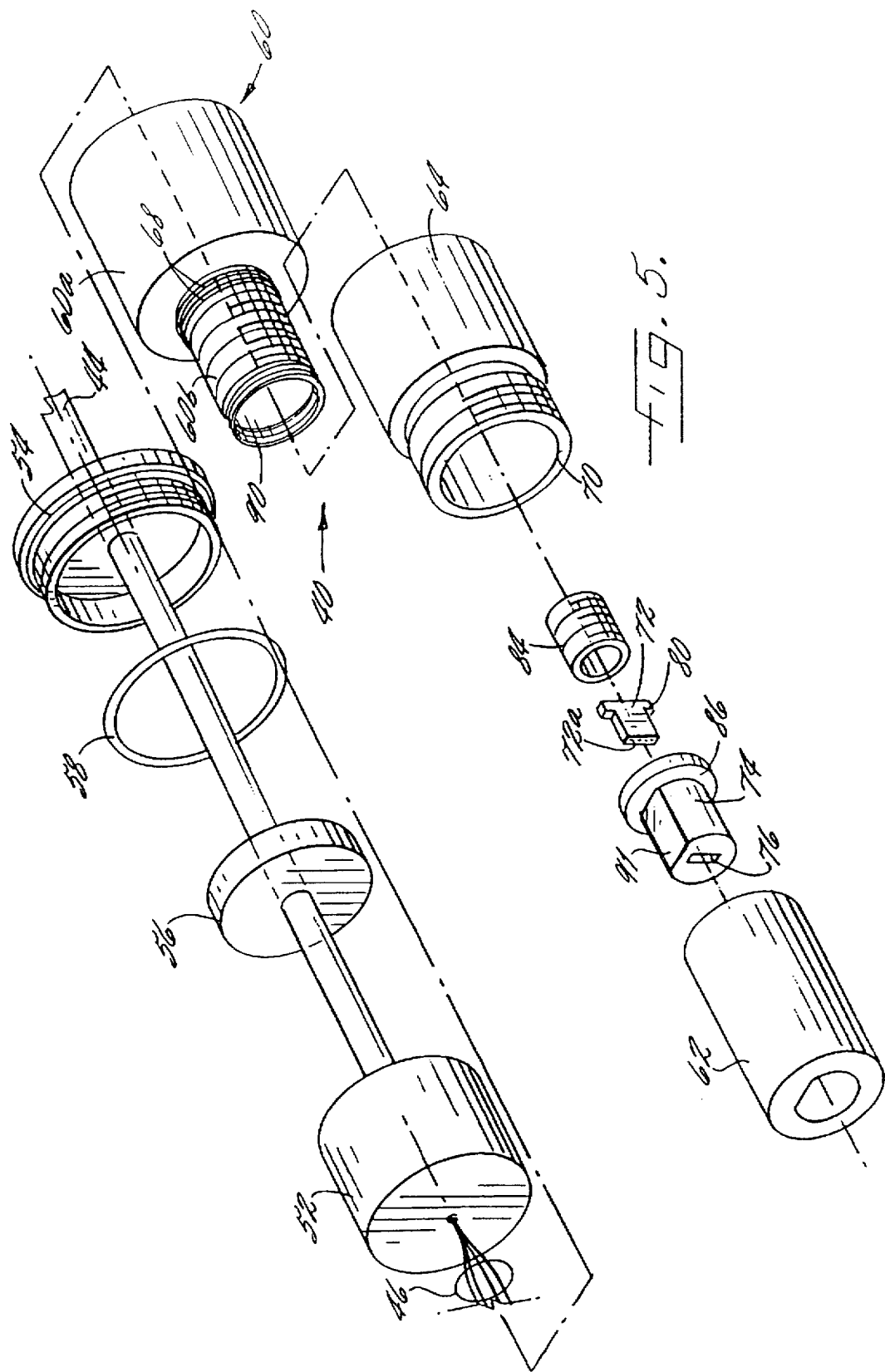
FIG. 5 is an exploded perspective view of a fiber optic cable assembly according to one embodiment to the present invention.

As illustrated in FIGS. 4 and 5, the gripping means can include a plug 52 encasing a portion of the fiber optic cable 44. As shown in cross-section in FIG. 4, the plug preferably encases a portion of the fiber optic cable surrounded by the protective jacket 50, as well as a portion of the fiber optic cable from the which the protective jacket has been removed. Accordingly, the plug securely engages the strength members 48 of the fiber optic cable which extend beyond the protective jacket. This engagement of the strength member by the plug protects the resulting optical interconnection by providing strain relief and torsion relief for the optical fibers 46.

Typically, the plug 52 is formed of a material which is impervious to water or moisture. For example, the plug can be formed of an epoxy, such as Uraseal UL-139, which is molded about a portion of the fiber optic cable 44. Thus, the plug serves as a barrier to prevent moisture traveling along the fiber optic cable from entering the enclosure 10. However, the plug can include a clamp or other type of build out which is secured about the fiber optic cable without departing from the spirit and scope of the present invention.

In order to retain the plug 52 within the housing 42, the fiber optic cable assembly 40 can include an annular retaining member 54, typically formed of stainless steel, which defines a central opening through which the fiber optic cable 44 extends. The annular retaining member preferably threadably engages the second end of the housing. As shown in FIGS. 4 and 5, the fiber optic cable assembly can also include a grommet 56 formed of a compressible material, such as silicon rubber. The grommet is preferably disposed between the annular retaining member and the plug. Thus, as the annular retaining member is threadably advanced within the second end of the housing, the grommet will be at least partially axially compressed, thereby causing the grommet to expand radially. As a result the grommet provides a further barrier to water migration along the fiber optic cable. In order to further improve the seal at the second end of the housing, a sealing member 58, such as an O-ring, can be disposed between the second end of the housing and the annular retaining member, as shown in FIGS. 4 and 5.

Although the housing 42 can be a unitary structure, the housing of the illustrated embodiment is formed of several components. In particular, the housing of this embodiment includes a rear portion 60 having an enlarged diameter portion 60a adjacent the second end of the housing within which the plug 52 is disposed and a reduced diameter portion 60b extending toward the first end of the housing. The housing of the illustrated embodiment can also include a forward portion 62 which defines the first end of the housing. The forward portion is connected to the rear portion, such as by threaded engagement of forward portion with the reduced diameter portion of the rear portion.

The housing 42 of the illustrated embodiment can also include a coupling nut 64 disposed about the forward portion 62 and connected to both the forward portion and the rear portion 60 of the housing. As shown in FIGS. 4 and 5, the coupling nut can be placed over the reduced diameter portion 60b of the rear portion of the housing prior to the threaded engagement of the forward portion with the reduced diameter portion of the rear portion. Once the forward portion of the housing has threadably engaged the reduced diameter portion of the rear portion of the housing, the coupling nut is held on the reduced diameter portion of the rear portion by the abutment of one end of the forward portion of the housing with a flange 66 which extends radially inward from the end of the coupling nut which is disposed over the reduced diameter portion of the rear portion of the housing. As shown, one or more O-rings 68 can be disposed between the inwardly extending flange of the coupling nut and the reduced diameter portion of the rear portion of the housing to facilitate relative rotational movement therebetween. As described below, the portion 70 of the coupling nut adjacent the first end of the housing is preferably threaded for engaging a corresponding receptacle 16.

The fiber optic cable assembly 40 of the present invention also includes a fiber optic connector 72 disposed at least partially within the first end 42a of the housing 42. In the illustrated embodiment, for example, the fiber optic connector is disposed at least partially within the forward portion 62 of the housing such that a first end 72a of the fiber optic connector is exposed through the first end of the housing.

While the fiber optic connector 72 can be held within the housing 42 in a variety of manners, the fiber optic cable assembly 40 of one embodiment can also include an alignment member 74, typically formed of plastic, for holding the fiber optic connector at least partially within the first end 42a of the housing. As described above in conjunction with the alignment member 28 of the receptacle 16, the alignment member of the fiber optic cable assembly also defines a cavity 76 shaped and sized to match the fiber optic connector. The cavity defined by alignment member opens toward the first end of the housing such that the first end 72a of a fiber optic connector disposed within the cavity is exposed within the first end of the housing. The alignment member of the illustrated embodiment also defines a generally cylindrical opening 78 which opens toward the second end 42b of the housing. The cavity and the generally cylindrical opening defined by the alignment member are connected to define a continuous passageway therethrough. As also described above in conjunction with the fiber optic connector of the receptacle, the rear or second end 72b of the fiber optic connector of the illustrated embodiment of the fiber optic cable assembly includes a pair of laterally extending tabs 80 which engage an internal shoulder 82 defined within the alignment member between the cavity which opens toward the first end of the receptacle body and the generally cylindrical opening which opens toward the second end of the receptacle body. Thus, the fiber optic connector can be properly seated within the cavity defined by alignment member such that the first end of the fiber optic connector is exposed through the first end of the housing.

The fiber optic cable assembly 40 of this embodiment can also include an externally threaded sleeve 84, typically formed of plastic, which is received within and threadably engages the generally cylindrical opening 78 defined by the alignment member 74. As shown in FIG. 4, the sleeve can be threadably advanced within the generally cylindrical opening defined by the alignment member until the sleeve contacts the rear or second end 72b of the fiber optic connector 72. As a result, the alignment member and the sleeve cooperate to secure the fiber optic connector within the cavity 76 defined by the alignment member by holding the laterally extending tabs 80 of the fiber optic connector against the internal shoulder 82 within the alignment member.

As shown in FIGS. 4 and 5, the alignment member 74 is typically inserted within the forward portion 62 of the housing 42 prior to the threaded engagement of the forward portion 62 of the housing with the reduced diameter portion 60b of the rear portion 60 of the housing. In order to properly seat the alignment member within the forward portion of the housing, the end of the alignment member which faces the second end 42b of the housing also preferably includes a flange 86 which extends radially outward for engaging an internal shoulder 88 defined within the forward portion of the housing. As shown in FIG. 4, the reduced diameter portion 60b of the rear portion 60 of the housing operatively engages the alignment member and, more particularly, the flange of the alignment member so as to hold the alignment member in position relative to the housing. For example, the fiber optic cable assembly can include a bias member 90 extending forwardly from the reduced diameter portion of the rear portion of the housing for urging the alignment member toward the first end of the housing such that the first end of the fiber optic connector is exposed therethrough. For example, the bias member can be formed of an elastomeric material, such as a gasket. Alternatively, the bias member can including a spring. Although the bias member urges the alignment member toward the first end of the housing, the bias member does permit limited retraction of the fiber optic connector upon the application of external forces, such as during the mating of the fiber optic cable assembly 40 with a corresponding receptacle 16 as described below.

The fiber optic connector 72 of the illustrated embodiment is a multi-fiber connector, such as an MT connector, for receiving the respective end portions of a plurality of optical fibers. However, the fiber optic connector can also include one or more single fiber connectors, such SC or ST connectors, for receiving the end portions of single optical fibers as shown in FIGS. 6 and 7. In any event, the fiber optic connector of the fiber optic cable assembly 40 should be of the same type, i.e., either a multi-fiber connector or a single fiber connector, as the fiber optic connector 24 of the receptacle 16 such that the fiber optic connectors can be properly connected.

As shown in FIG. 4, the bore defined by the housing 42 preferably includes a storage chamber 92 for storing excess lengths of the optical fibers 46. For example, the storage chamber can be defined within the reduced diameter portion 60b of the rear portion 60 of the housing between the plug 52 and the fiber optic connector 72. By storing excess lengths of the optical fibers, additional lengths of optical fiber can be provided if the fiber optic connector must be replaced or reconnected.

Once the fiber optic cable assembly 40 has been mounted upon the end portion of a fiber optic cable 44, the fiber optic cable assembly can be mated with a corresponding receptacle 16 mounted at least partially within the wall 12 of an enclosure 10, such as ONU, a NID or a splice closure. In the illustrated embodiment, the fiber optic cable assembly and the receptacle would be mated by threadably engaging the first end 18a of the receptacle body 18 with the threaded portion 70 of the coupling nut 64. In this regard, the coupling nut is adapted to rotate relative to the remainder of the fiber optic cable assembly and the receptacle to provide for the threaded advancement of the coupling nut within the first end of the receptacle body. As a result of the mating of the fiber optic cable assembly with the receptacle, the optical fibers 46 of the fiber optic cable on which the fiber optic cable assembly is mounted and the optical fibers 26 held by the receptacle which extend into the enclosure are optically interconnected.

According to one advantageous embodiment, the alignment members of both the fiber optic cable assembly 40 and the receptacle 16 preferably include respective alignment features 91. The respective alignment features are preferably disposed in a predetermined positional relationship to the fiber optic connector and, in turn, to the optical fibers upon which the fiber optic connector is mounted. By appropriately aligning the alignment features of the respective alignment members, the fiber optic connectors and, in turn, the optic fibers upon which the fiber optic connectors are mounted can be appropriately aligned to facilitate efficient optical coupling therebetween.

Upon mating of the fiber optic cable assembly 40 with the receptacle 16, the respective alignment members of the receptacle and the fiber optic cable assembly are disposed within and fit snugly within the reduced diameter portion 18b of the receptacle. In the illustrated embodiment, the reduced diameter portion of the receptacle 16 has a flat surface 19. Correspondingly, the alignment features 91 of the alignment members of the receptacle and the fiber optic cable assembly can include a flat surface on one side thereof which matches the flat surface of the reduced diameter portion of the receptacle in size and shape. As a result, the alignment members can only be inserted within the reduced diameter portion of the receptacle in one orientation. Since the fiber optic connectors and, in turn, the optical fibers upon which the fiber optic connectors are mounted are disposed in a predetermined positioned relationship to the respective alignment features, this orientation of the fiber optic connectors will insure that the optical fibers 46 of the fiber optic cable 44 on which the fiber optic cable assembly is mounted are aligned with the optical fibers 26 extending through the receptacle and into the enclosure once the fiber optic cable assembly has been mated with the receptacle. While alignment members having flat surfaces which serve as the alignment features are described and illustrated herein, the alignment members can include other types of alignment features or alignment keys without departing from the spirit and scope of the present invention.

During the mating of the fiber optic cable assembly 40 with the receptacle 16, the respective bias members of the receptacle and the fiber optic cable assembly permit limited retraction of the respective fiber optic connectors. However, the bias members also urge the fiber optic connectors toward one another once the fiber optic cable assembly and the receptacle are mated such that the fiber optic connectors are held in an abutting relationship. The alignment of the fiber optic connectors is further facilitated by guide pins 92 which extend from the first end of one of the fiber optic connectors for receipt within corresponding openings defined within the first end of the other fiber optic connector.

While a fiber optic cable assembly 40 and a corresponding receptacle 16 which include respective multi-fiber connectors are shown in FIGS. 1–5 and have been primarily described hereinabove, the fiber optic cable assembly and the corresponding receptacle can include one or more single fiber connectors 94 as shown in FIGS. 6 and 7. In this embodiment, the fiber optic cable assembly and the corresponding receptacle each include a pair of single fiber connectors which can be coupled to connect the respective optic fibers 96. In addition, the embodiment of FIGS. 6 and 7 is simplified relative to the embodiment of FIGS. 1–3 since the receptacle of FIGS. 6 and 7 does not include a bias member, among other components. However, the embodiment of the fiber optic interconnection apparatus illustrated in FIGS. 6 and 7 still permits the optical fibers of the fiber optic cable 44 upon which the fiber optic cable assembly 40 is mounted to be optically interconnected with optical fibers held by the receptacle which extend into the enclosure 10 without requiring the enclosure to be opened.

According to the present invention, the optical fibers 26 held by the receptacle 16 which extend through the receptacle and into the enclosure 10 can be terminated in advance, such as during the initial configuration of the enclosure. For example, the optical fibers held by the receptacle which extend through the receptacle and into the enclosure can be spliced to other optical fibers or can be connected to various active components within the enclosure. Following the mating of the fiber optic cable assembly 40 with the receptacle and the resulting optical interconnection of the optical fibers 46 of the fiber optic cable 44 upon which the fiber optic cable assembly is mounted with the optical fibers held by the receptacle Rich extend through the receptacle and into the enclosure, the various optical fibers of the fiber optic cable upon which the fiber optic cable assembly is mounted are appropriately terminated within the enclosure without requiring the enclosure to be opened. Therefore, the risk of damage to the active equipment within the enclosure is reduced. In addition, the technicians who assemble the fiber optic cable assembly and mate the fiber optic cable assembly with the appropriate receptacle need no longer terminate the optical fiber within the enclosure since the appropriate terminations can all be made at one time, such as during the initial configuration of the enclosure.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A fiber optic interconnection apparatus comprising:

a receptacle mounted at least partially within a wall of an enclosure, said receptacle comprising:

a receptacle body having first and second opposed ends and defining a bore extending lengthwise therebetween, wherein the second end of said receptacle body opens into the enclosure; and a fiber optic connector disposed at least partially within the bore of said receptacle body, said fiber optic connector being adapted to be mounted on an end portion of a first optical fiber which extends through the second end of said receptacle body and into the enclosure; and a fiber optic cable assembly for mating with said receptacle, said fiber optic cable assembly comprising:

a housing having first and second opposed ends and defining a bore extending lengthwise therebetween, wherein the second end of said housing is adapted to receive an end portion of a fiber optic cable containing the second optical fiber; and a fiber optic connector disposed at least partially within the first end of said housing, said fiber optic connector being adapted to be mounted on an end portion of the second optical fiber, wherein the respective fiber optic connectors of said receptacle and said fiber optic cable assembly are disposed in an aligned relationship upon mating of said fiber optic cable assembly with said receptacle such that the second optical fiber of the fiber optic cable is optically interconnected with the first optical fiber which extends into the enclosure.

2. A fiber optic interconnection apparatus according to claim 1 wherein said housing of said fiber optic cable assembly comprises a threaded coupler, and wherein the first end of said receptacle body is at least partially threaded for threadably engaging said threaded coupler upon mating of said fiber optic cable assembly with said receptacle.

3. A fiber optic interconnection apparatus according to claim 1 wherein said fiber optic cable assembly further comprises an alignment member for holding said respective fiber optic connector at least partially within the first end of said housing, said alignment member of said fiber optic cable assembly comprising an alignment feature disposed in a predetermined relation to said fiber optic connector held by said alignment member, and wherein said receptacle further comprises an alignment member for holding said respective fiber optic connector at least partially within the first end of said receptacle body, said alignment member of said receptacle also comprising an alignment feature disposed in a predetermined relation to said fiber optic connector held by said alignment member.

4. A fiber optic interconnection apparatus according to claim 3 wherein said receptacle body comprises means for aligning the respective alignment features of said fiber optic cable assembly and said receptacle such that such that the second optical fiber of the fiber optic cable is aligned with the first optical fiber which extends into the enclosure once said fiber optic cable assembly and said receptacle are mated.

5. A fiber optic interconnection apparatus according to claim 1 wherein said fiber optic cable assembly further comprises means, disposed within said housing, for gripping the end portion of the fiber optic cable such that the end portion of the fiber optic cable is retained within said housing.

6. A fiber optic interconnection apparatus according to claim 5 wherein the bore defined by said housing of said fiber optic cable assembly includes a storage chamber, disposed between said gripping means and said respective fiber optic connector, for storing excess portions of the second optical fiber.

7. A fiber optic interconnection apparatus according to claim 1 wherein said fiber optic cable assembly further comprises a bias member disposed within the bore defined by said housing, wherein said receptacle further comprises a bias member disposed within the bore defined by said receptacle body, and wherein said respective bias members of said fiber optic cable assembly and said receptacle permit limited retraction of said respective fiber optic connectors upon mating of said fiber optic cable assembly with said receptacle.

8. A fiber optic interconnection apparatus according to claim 1 wherein said respective fiber optic connectors of said receptacle and said fiber optic cable assembly are selected from the group consisting of single fiber connectors for receiving the end portion of a single optical fiber and multi-fiber connectors for receiving the end portions of a plurality of optical fibers.

* * * * *